May 1, 1951        J. J. FLATON        2,550,795

TORQUE LIMITING CLUTCH

Filed Nov. 29, 1948

INVENTOR
JACOB J. FLATON

BY *John H Cassidy*

ATTORNEY

Patented May 1, 1951

2,550,795

UNITED STATES PATENT OFFICE 2,550,795

TORQUE LIMITING CLUTCH

Jacob J. Flaton, St. Louis County, Mo.

Application November 29, 1948, Serial No. 62,515

4 Claims. (Cl. 192—56)

This invention relates to a torque limiting clutch.

It is an object of the invention to provide a torque limiting clutch which may be reset more easily and quickly than is now possible with the prior art devices.

Another object of the invention is to provide a torque limiting clutch which is simple in construction and comparatively inexpensive to manufacture.

Still another object of the invention is to provide a torque limiting clutch which does not require a "shut down" for its reengagement after an overload has been removed from its driven member.

Other objects and advantages will become apparent as the specification proceeds and a more comprehensive understanding of the invention will be afforded from the following detailed description when considered in conjunction with the accompanying drawing, in which Fig. 1 is a longitudinal sectional view of a torque limiting clutch embodying the instant invention;

Figure 1:
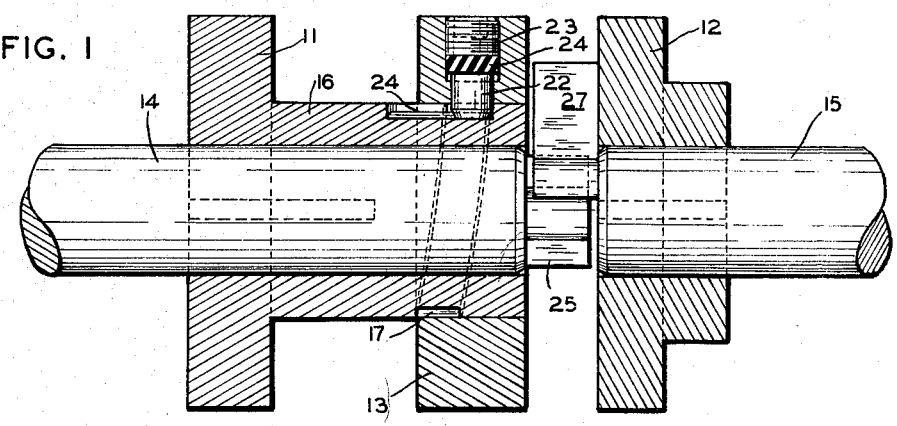
Figure 2:
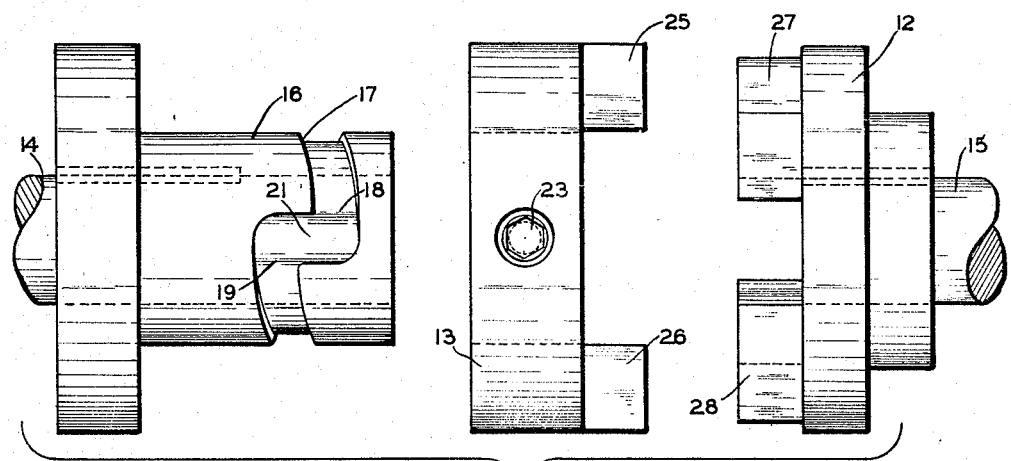
Fig. 2 is an exploded side view thereof.

Torque limiting clutches of various types are in present day use but without exception they are rather complex and require a substantial amount of effort to reengage their elements after an overload has caused a disengagement of the clutch. In most instances, these devices employ a disengaging mechanism which relies on the movement of a pin in a helical groove or the equivalent of these elements, and accordingly, the clutch can be reset only by a reverse rotation of its disengaging element to its normal position.

The instant device on the contrary has but three principal parts and is reset simply by moving its disengaging member coaxially with driving and driven shafts on which its clutch elements are mounted. Thus, one clutch member, which is permanently keyed to a shaft, is provided with a collar adapted to rotate about, and move longitudinally of, a cylindrical extension forming a part of said member. Projecting inwardly from the collar is a resiliently pressed pin which seats itself in a longitudinally disposed groove cut in the surface of the extension, which groove is depressed below the mouth of a helical slot whose ends connect with the ends of said groove.

Under normal load conditions, the collar is rotatable with its clutch member, the collar mounting a plurality of engaging prongs which contact companion prongs carried on a second clutch member also keyed to a shaft. Upon the occurrence of an overload on one of the shafts, the pin of the collar is raised from the groove and moves into the helical slot. This causes the collar to move lengthwise of the extension and disengages its prongs with those of the second clutch member to break the power train. As the pin is carried to the end of the helical slot, it returns to the opposite end of the connecting groove and the clutch may be reset by moving the collar backwardly along the extension to its engaging position, the pin thereof moving in the connecting groove.

In greater detail, the torque limiting clutch of the instant invention comprises a first clutch member 11, a second clutch member 12 and a collar 13. Although either of the members 11 or 12 may be used as the driven member, the clutch element 11 will be considered as such for the purpose of this description and the clutch element 12 as the driving member. The former, therefore, is keyed to a driven shaft 14, and the latter is a driving shaft 15. The driven member 11 has as a part thereof a cylindrically shaped extension 16 in which is channelled a helical slot 17. Considering the mouth and end of this slot to be at points 18 and 19, respectively, it may be said that its ends are connected by a longitudinally extending groove 21.

As viewed in Fig. 1, the collar 13 is adapted to be passed onto the extension 16 about which it is free to rotate and also along which it may be moved. This collar carries a pin 22 which, under normal load conditions, seats itself in the groove 21 at the right hand extremity thereof. A set screw 23, acting indirectly through a resilient member 24, such as a rubber washer, holds the pin in the groove.

Further, the collar 13 has formed as a part thereof two clutch prongs 25 and 26 which are adapted to be contacted by companion clutch prongs 27 and 28 of the clutch member 12 when the clutch elements are operating in their normal positions as shown in Fig. 1.

Figure 3:
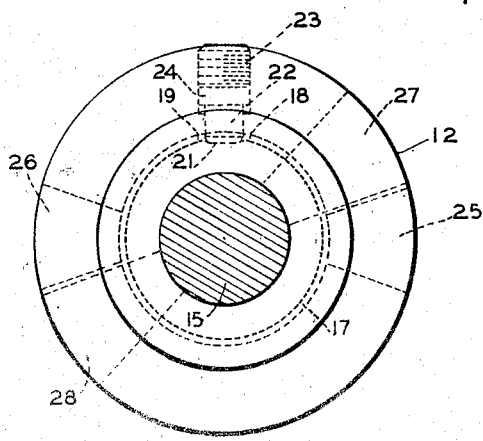
Fig. 3 is an end view of the same.

As illustrated in Fig. 3, the groove 21 is depressed below the mouth 18 and the terminal end 19 of the helical slot. Thus, when the clutch is operating under normal load conditions the pin 22 rides in the groove, and, through the clutch prongs 25, 26, 27 and 28, the collar is driven by the driving clutch member 12 to rotate the driven clutch member 11.

Upon the occurrence of an overload on the shaft 14, the pin 22 is caused to ride out of the groove 21 and into the helical slot 17. Through the continuously applied power of the driving clutch member 12, the collar 13 is then rotated in a clockwise direction, looking at the clutch from the right to the left, and is displaced to the left to disengage the prongs 25 and 26 from contact with the prongs 27 and 28 of the driving member 12, thus breaking the power train. At the end of this action the pin 22 comes to rest in the left hand end of the groove 21.

After the overload has been removed from the shaft 14, the clutch is reset by moving the collar 13 longitudinally of the extension 16 until the prongs 25 and 26 thereof engage the prongs 27 and 28 of the driving member 12. This operation may be accomplished while the driving element 12 is rotating.

Thus, it is seen that through the expedient of the connecting groove 21, the clutch is adapted to be reset without a reverse rotation of its disengaging element, and that the working parts of the device have been reduced to a minimum, offering a simplicity in construction greater by far than that of the prior art devices.

Various changes may be made in the details of construction, within the scope of the appended claims, without departing from the spirit of this invention. Parts of the invention may be used without the whole and improvements may be added while retaining some or all of the advantages of the invention.

What is claimed is:

1. In a torque limiting clutch having driving and driven clutch members disengageable by means movable longitudinally of the axis of rotation of said members through the action of a resiliently pressed pin riding in a helical slot, the improvement comprising a groove connecting the ends of said helical slot, said groove being cut to a greater depth than that of said helical slot.

2. In a torque limiting clutch, a first clutch member having an extension thereon adapted to receive a collar, said first member being keyed to a shaft to turn therewith, a helical slot cut in the face of said extension, a longitudinal groove connecting the ends of said slot, a collar mounting a plurality of clutch prongs adapted to be passed onto said extension, a resiliently pressed pin extending through said collar into said groove to be normally seated therein, and a second clutch member adapted to be keyed to a second shaft to turn therewith, said second clutch member having a plurality of clutch prongs adapted to engage the said prongs of said collar.

3. In a torque limiting clutch having driving and driven clutch members, the combination of means for operatively connecting said members, means for moving said connecting means to disengage said members comprising a helical slot cut in one of said members, and a resiliently pressed pin passed from said connecting means into said slot, and means providing for the longitudinal displacement of said connecting means without rotation thereof comprising a return slot for said pin connecting the ends of said helical slot.

4. In a torque limiting clutch, a first clutch member, a second clutch member comprising first and second sections each mounting clutch prongs adapted for mutual engagement and disengagement, said first section being adapted to rotate about and move along the axis of said first member, a helical slot cut in said first member, a resiliently pressed pin projecting from said first section adapted to move in said slot and displace said first section away from said second section to disengage said prongs, and means comprising a groove cut in said first member parallel to its axis of rotation and connecting the ends of said helical slot providing for the reversed axial displacement of said first section toward said second section to engage said prongs.

JACOB J. FLATON.

REFERENCES CITED

The following references are of record in the file of this patent:

UNITED STATES PATENTS

| Number | Name | Date |
| --- | --- | --- |
| 1,686,989 | Ridley | Oct. 9, 1928 |
| 2,061,220 | Cotterman | Nov. 17, 1936 |
| 2,091,269 | Colman | Aug. 31, 1937 |
| 2,401,992 | Waller | June 11, 1946 |